United States Patent [19]

Takemori et al.

[11] Patent Number: 5,681,605

[45] Date of Patent: Oct. 28, 1997

[54] PRETZEL AND METHOD FOR PREPARATION OF THE SAME

[75] Inventors: Toshio Takemori, Tokyo; Toshinobu Tsurumi, Saitama; Masahiro Takagi, Saitama; Shunichi Terasaki, Saitama, all of Japan

[73] Assignee: Lotte Co., Ltd., Tokyo, Japan

[21] Appl. No.: 415,311

[22] Filed: Apr. 3, 1995

[30] Foreign Application Priority Data

Apr. 1, 1994 [JP] Japan .................. 6-065143

[51] Int. Cl.[6] .............. A21D 8/06; A21D 8/00; A23P 1/12; A23G 3/20
[52] U.S. Cl. .................. 426/549; 426/499; 426/514; 425/298
[58] Field of Search ............... 426/549, 499, 426/514; 425/298

[56] References Cited

U.S. PATENT DOCUMENTS

| | | |
|---|---|---|
| 3,615,675 | 10/1971 | Wisdom et al. .................. 99/83 |
| 3,763,765 | 10/1973 | Nelson et al. . |
| 4,241,649 | 12/1980 | Nelson et al. . |
| 4,283,430 | 8/1981 | Doster et al. . |
| 4,759,939 | 7/1988 | Keller et al. . |
| 4,861,536 | 8/1989 | Grof et al. .................. 264/108 |
| 4,873,093 | 10/1989 | Fazzolare et al. .................. 426/28 |
| 5,185,167 | 2/1993 | Schwartz . |
| 5,238,693 | 8/1993 | Walsh .................. 426/293 |

*Primary Examiner*—Esther Kepplinger
*Assistant Examiner*—Cloon P. Koh
*Attorney, Agent, or Firm*—Young & Thompson

[57] ABSTRACT

A pretzel stick having a hollow portion along a longitudinal center is prepared by baking a material which consists essentially of 100 parts by weight of grain flour, 5–50 parts by weight of saccharides, 5–60 parts by weight of oils and fats, and 0–60 parts by weight of starch. The preparation process of the pretzel stick comprises the steps of preparing the material, extruding the material through a ring nozzle so that the extruded material has a cylindrical shape with a hollow portion along the longitudinal center thereof, baking the extruded material, cutting the baked material to a constant length, and injecting a filling material having an adjusted viscosity into the hollow portion.

9 Claims, 1 Drawing Sheet

PRETZEL AND METHOD FOR PREPARATION OF THE SAME

FIELD OF THE INVENTION

The invention relates to a stick type pretzel and a method for preparation of the same.

BACKGROUND OF THE INVENTION

In the prior arts, traditional pretzels have been prepared by cutting a bread material into slender parts which are subsequently formed in various shapes, for example, ring shape, 8-shape, B-shape or the like, and baking those slender parts of material. Various types of pretzels are known in the art, but there is no hollow-type pretzel having a hollow portion along a longitudinal center of a stick-type pretzel. Recently, in place of yeasty bread materials, non-fermentation type materials for stick-type pretzel have been used together with expanding agent, and mass production of such pretzels have been realized. However, no hollow-type pretzel made of non-fermentation material has ever been known in the prior art.

In production of the non-fermentation stick type pretzel, the following processes for providing an unique flavor to the pretzel have been known in the art. For preparation of the stick-type pretzel, an extruder is used to extrude the stick-type pretzel. The extruder has a double cylindrical structure, wherein two cylinders or outer and inner cylinders are placed on a coaxial position. The pretzel material 21 is extruded between the outer and inner cylinder while a center material 22 providing flavor to the pretzel is extruded within the inner cylinder. These materials are then baked to prepare a complex-type pretzel 20 having the double cylindrical structure illustrated in FIG. 1. This type of pretzel however, has several drawbacks with respect to change in taste and feel due to the baking of the outer pretzel material 21 together with the center material 22.

Moreover, another type of stick pretzel was proposed as illustrated in FIG. 2 in which a pretzel 31 is coated with chocolate 32 along, or in combination with, flute and natus. This type of the pretzel is, also has the drawback of having the chocolate 32 in contact with a hand of a person who handles the pretzel. Moreover under a high temperature, the chocolate will melt, even if the outer coating material is solid. This provides displeasure to the consumers.

SUMMARY OF THE INVENTION

Accordingly, it is an object of the present invention to provide a stick-type pretzel free from any of the drawbacks described above.

It is another object of the present invention to provide a novel method of preparation of a stick-type pretzel free from any of the above-mentioned disadvantage.

The present invention provides a stick-type pretzel having a hollow portion along a longitudinal center of the stick-type pretzel, wherein said pretzel is prepared by baking a material which consists essentially of 100 parts by weight of grain flour, 5–50 parts by weight of saccharides, 5–60 parts by weight of oils and fats, and 0–60 parts by weight of starch. It is preferable that the saccharides be in the range from 5 to 30 parts by weight, the oils and fats in the range from 10 to 30 parts by weight, and the starch in the range from 20 to 50 parts by weight. It is more preferable that the saccharides be in the range from 10 to 20 parts by weight, the oils and fats in the range from 15 to 25 parts by weight, and the starch in the range from 30 to 45 parts by weight. It is also preferable that the baked pretzel material have a cylindrical shape having an outer diameter of 15 millimeters or less. It is moreover preferable that the baked pretzel material have a cylindrical shape having an outer diameter of 10 millimeters or less and an inner diameter of 40% or more of the outer diameter. It is also preferable that the hollow portion of the pretzel be filled with a tasting or flavoring material for providing a predetermined taste to the pretzel. It is furthermore preferable that the flavoring material is limited within opposite opening portions of the hollow portion of the baked material of the pretzel, or that opposite ends of the tasting material within the hollow portion of the pretzel have a concave shape.

The present invention provides a method of preparing a stick-type pretzel, which comprises the steps of preparing a material which consists essentially of 100 parts by weight of grain flour, 5–50 parts by weight of saccharides, 5–60 parts by weight of oils and fats, and 0–60 parts by weight of starch, extruding the material by use of ring nozzle so that the extruded material has a cylindrical shape with a hollow portion along a longitudinal center of the stick-type pretzel, baking the extruded material, cutting the baked material to a constant length and injecting a tasting material with an adjusted viscosity into the hollow portion. It is preferable that the saccharides be in the range from 5 to 30 parts by weight, the oils and fats in the range from 10 to 30 parts by weight, and the starch in the range from 20 to 50 parts by weight. It is more preferable that the saccharides be in the range from 10 to 20 parts by weight, the oils and fats in the range from 15 to 25 parts by weight, and the starch in the range from 30 to 45 parts by weight. It is also preferable that the ring nozzle have an outer diameter of 18 millimeters or less. It is moreover preferable that the ring nozzle have an outer diameter within 11 millimeters and an inner diameter of 50% or more of the outer diameter. It is also preferable that prior to the baking process, the extruded material be subjected to an alkaline liquid treatment.

BRIEF DESCRIPTION OF THE DRAWINGS

Preferred embodiments of the invention will be described in detail with reference to the accompanying drawings.

DESCRIPTIONS OF THE INVENTION

Figure 1:
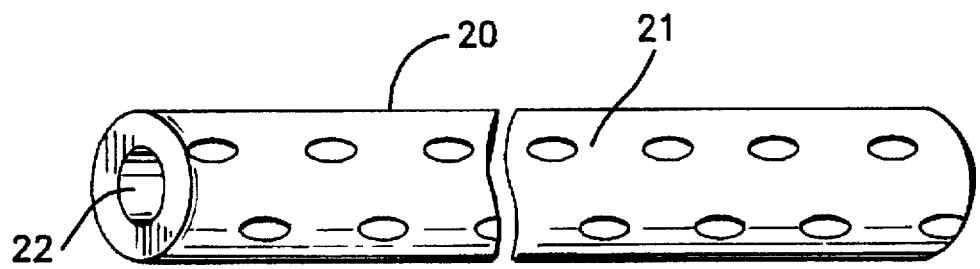
FIG. 1 is a perspective view illustrative of the conventional stick-type pretzel.
Figure 2:
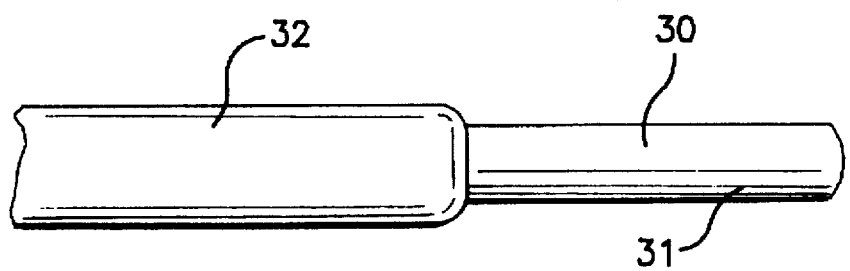
FIG. 2 is a perspective view illustrative of another conventional stick-type pretzel.

The present invention was conceived on the bases of the following viewpoints. The inventors have drawn their attentions to fact that the baking the pretzel material together with the flavoring material leads to the drawbacks described above. In consideration of this fact, the inventors conceived the separate preparation of the baked material into a pretzel and thereafter introducing the flavoring material into the hollow portion of the baked material.

The general mixture ratio for preparing the pretzel stick is 100 parts by weight of grain flour, 5 parts or less by weight of saccharides, and 1–4 parts by weight of oils and fats, wherein no starch is used. In this case, it is difficult to prepare a cylindrical and stick-type pretzel with a hollow portion along a longitudinal center of the pretzel stick. Such general mixture has a sufficient hardness to make it difficult to extrude the material by use of a ring type extruder nozzle. Even if the extrusion is carried out, then the material becomes damaged due to the load generated in the extrusion. If the water content is increased to reduce the hardness thereof, then another problem with a deformation of the extruded material may be raised, thereby making it difficult to bake the material to a predetermined desired shape.

In extruding the material through the ring nozzle of the extruder, it is preferable that the material have a controlled hardness with an extendable property, but after baking, the material is required to have a sufficient hardness to keep the cylindrical shape thereof. The above conventional material could not satisfy those requirements.

It was discovered by the inventors that a mixture of grain flour with saccharides and oils and fats at predetermined ratios allows a preparation of the desired cylindrical pretzel with the hollow portion along the longitudinal center of the pretzel.

It was further discovered that the use of starch in combination with the adjusted amounts of saccharides, oils and fats facilitates extrusion through a ring nozzle extruder having a small difference between the inner and outer diameters, which allows for the preparation of the pretzel having a small difference between the inner and outer diameters.

According to the present invention, one may use as grain flour: wheat flour, barley flour, rye flour, oats flour, corn flour and the like. It is also preferable to use the wheat flour in view of its hardness and gluten intensity so that weak flour is not more than 50%.

As available saccharides, one may use: sugar, maltose, lactose, glucose, fructose, invert sugar, starch sugar, isomer sugar, and the like. It is preferable to use those saccharides in a ratio ranging from 5–50 parts by weight to 100 parts of grain flour. When the inner diameter is large, 5–30 parts by weight thereof is available, and 10–20 parts by weight thereof is preferable.

As available oils and fats one may use butter, shortening, margarine, liquid oil, solid oil and the like. As compared to 100 parts by weight of grain flour, 5–60 parts by weight of the oils and fats is available. When the inner diameter is large, 10–30 parts by weight thereof is available and 15–25 parts by weight thereof is preferable.

As starch one may use: corn starch, potato starch, wheat starch as well as alpharized, roasted or hydrolyzed starch or other deformed starch. One should use 0–60 parts by weight of the starch versus 100 parts by weight of the grain flour sweetness, but when the inner diameter is large, then 20–50 parts by weight of the starch, preferably 30–45 parts by weight, should be employed.

Furthermore, one may use as sub-material, if desired, daily dairy products, egg, essence, synthetic seasoning, expanding agent and the like.

A suitable amount of water is added and mixed to the material as described above. The material is subjected to a continuous extrusion through a ring nozzle extruder to form a cylindrically shaped extruded material with a hollow portion along the longitudinal direction of the material. When filling the flavoring material into the hollow part of the baked pretzel material, an inner diameter of the pretzel is preferably 40% or more of the outer diameter thereof. The diameter of the pretzel may be 15 millimeters or less, preferably 10 millimeters. The outer diameter of the ring nozzle may be 18 millimeters or less, preferably 11 millimeters or less.

The extruded material is, if desired, subjected to an alkaline liquid treatment by continuous passage through an alkaline bath. It is of course possible to omit this alkaline treatment according to the present invention.

Such an alkaline liquid treatment makes the pretzel crispier and reduces adhesion of the material onto the processing belt used in producing the pretzel. The treatment has to be carefully monitored to prevent any deformation to the pretzel due to a change in water content. It is also necessary to prevent the material of the pretzel from floating on the alkaline liquid bath. As the alkaline liquid, one may use a solution of sodium hydroxide, sodium carbonate, and the like.

Figure 3:
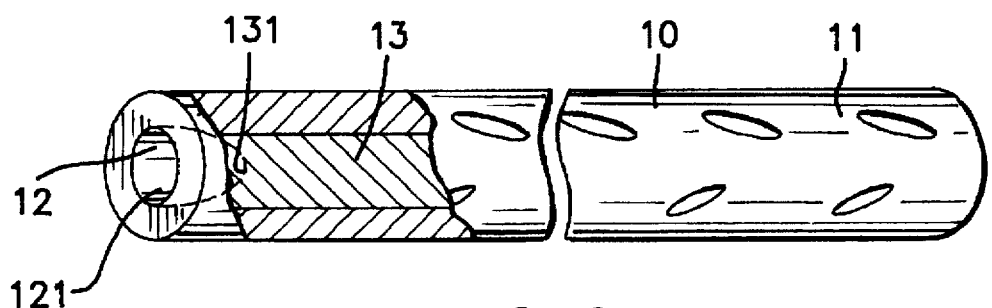
FIG. 3 is a perspective view with a partial sectioned view illustrative of a novel stick-type pretzel according to the present invention.

The extruded material is introduced into an oven for baking the same to prepare a cylindrically shaped baked material 11 with an outer diameter of 15 millimeters or less, preferably 10 millimeters or less and an inner diameter of 40% of the outer diameter as illustrated in FIG. 3.

The baked material 11 is then cut to a desired length for subsequent filling a flavoring material 13 into the hollow portion 12 of the baked material 11. The flavoring material 13 may be cream, chocolate, mayonnaise, jam, butter, curry and the like to thereby produce the pretzel.

For filling the flavoring material 13, the cut baked material 11 is positioned vertically so that from an upper opening 121 of the hollow portion the flavoring material is introduced into the hollow portion. The flavoring material has a selected viscosity so as to allow the injection to reach the opposite bottom opening 122 of the hollow portion.

Figure 4:
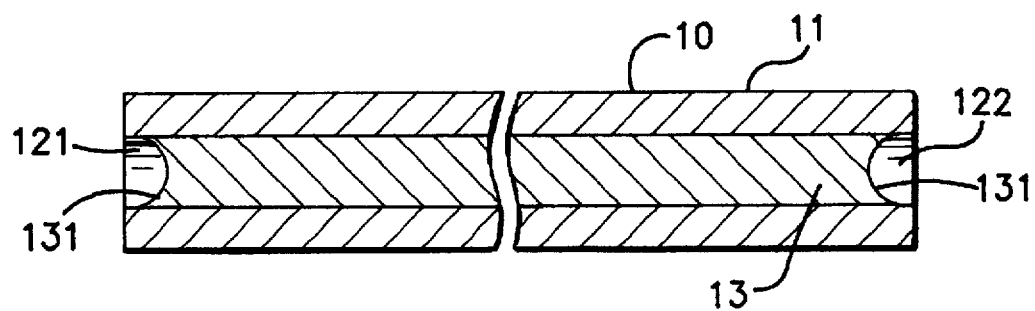
FIG. 4 is a cross-sectional elevation view illustrative of a novel stick-type pretzel according to the present invention.

When selecting cream, mayonnaise or jam, no further process is required, but if another filling material is selected then it is required to leave the pretzel for a sufficient time to subsequently cool and dry the same so as to solidify the flavoring material. As a result, the flavoring material remains inside of the opposite openings 121 and 122 and opposite ends 131 and 132 of the tasting material are concave to thereby prepare the pretzel as illustrated in FIG. 4.

The amounts of oils and fats and saccharides are determined as a function of the desired softness and flexibility for extrusion. The use of starch may prevent the material from being damaged in the extruder.

The use of saccharide and starch in the predetermined ratios may improve the viscosity and hardness of the pretzel material.

EXAMPLE 1

60 parts by weight of strong flour, 40 parts by weight of weak wheat flour, 20 parts by weight sugar, 25 parts by weight of shortening, 40 parts by weight of wheat starch, 5 parts by weight of skim milk, 1.5 parts by weight of salt, 1 part by weight of sodium bicarbonate and 60 parts by weight of water were mixed with each other and stirred to prepare the material for the pretzel.

The material was extruded in an extruder provided with a ring nozzle having an outer diameter of 6 millimeters and an inner diameter of 4 millimeters to thereby form a cylindrically shaped extruded material with a hollow portion along the longitudinal direction. The extruded material was continuously immersed into a liquid containing 0.7% of sodium hydroxide at a temperature of 95° C. in an alkaline bath and thereafter baked in a mesh oven to produce the baked pretzel material having an outer diameter of 5 millimeters and inner diameter of 2.5 millimeters.

The baked material was then cut to a length of 120 millimeters and positioned in a vertical direction so that, from an upper opening of the hollow portion of the baked material, a molten chocolate was injected for subsequent cooling down to solidify the melted chocolate to thereby obtain a chocolate pretzel. The solid chocolate has concave opposite ends. The pretzel provides a double taste of the pretzel material and the chocolate.

EXAMPLE 2

80 parts by weight of strong wheat flour, 10 parts by weight of weak wheat flour, 10 parts by weight of corn flour, 12 parts by weight of starch syrup (25% of moisture), 10 parts by weight sugar, 10 parts by weight of butter, 10 parts by weight of shortening, 30 parts by weight of potato starch and 65 parts by weight of water were mixed with each other and stirred to prepare the material for the pretzel.

The material was extruded in an extruder provided with a ring nozzle having an outer diameter of 8.5 millimeters and an inner diameter of 5.5 millimeters to thereby form a cylindrically shaped extruded material with a hollow portion along the longitudinal direction. The extruded material was thereafter baked in a mesh oven to produce the baked pretzel material having an outer diameter of 8 millimeters and inner diameter of 5 millimeters.

The baked material was then cut to a length of 50 millimeters to be positioned in a vertical direction so that, from an upper opening of the hollow portion of the baked material, a cream cheese was injected and subsequently cooled down to solidify it, and to thereby obtain a cream cheese pretzel. The solid cream cheese has concave opposite ends. The pretzel provides a double taste of the pretzel material and the cream cheese.

EXAMPLE 3

60 parts by weight of strong wheat flour, 40 parts by weight of weak wheat flour, 12 parts by weight sugar, 17 parts by weight of shortening, 32 parts by weight of wheat starch, 5 parts by weight of skim milk, 1.5 parts by weight of salt, 1 part by weight of sodium bicarbonate and 60 parts by weight of water were mixed with each other and stirred to prepare the material for the pretzel.

The material was extruded with an extruder provided with a ring nozzle having an outer diameter of 6 millimeters and an inner diameter of 4 millimeters to thereby form a cylindrically shaped extruded material with a hollow portion along the longitudinal direction. The extruded material was continuously immersed into a liquid containing 0.7% of sodium hydroxide at a temperature of 95° C. in an alkaline bath and thereafter baked in a mesh oven to produce the baked material for pretzel having an outer diameter of 5 millimeters and inner diameter of 2.5 millimeters.

The baked material was then cut to a length of 120 millimeters and positioned in a vertical direction so that, from an upper opening of The hollow portion of the baked material, melted chocolate was injected and subsequently cooled down to solidify the melted chocolate and obtain a chocolate pretzel. The solid chocolate has concave opposite ends. The pretzel provides a double taste of the pretzel material and the chocolate.

EXAMPLE 4

60 parts by weight of strong wheat flour, 40 parts by weight of weak wheat flour, 8 parts by weight of starch syrup (25% of moisture), 10 parts by weight of sugar, 10 parts by weight of butter, 9 parts by weight of shortening, 32 parts by weight of wheat starch, 5 parts by weight of skim milk, 1.5 parts by weight of salt, 1 part by weight of sodium bicarbonate and 60 parts by weight of water were mixed with each other and stirred to prepare the material for the pretzel.

The material was extruded in an extruder provided with a ring nozzle having an outer diameter of 8.5 millimeters and an inner diameter of 5.5 millimeters to thereby form a cylindrically shaped extruded material with a hollow portion along the longitudinal direction. The extruded material was thereafter baked in a mesh oven to produce the baked pretzel material having an outer diameter of 8 millimeters and inner diameter of 5 millimeters.

The baked material was then cut to a length of 50 millimeters and positioned in a vertical direction so that, from an upper opening of the hollow portion of the baked material, a cheese cream was injected for subsequent cooling down to solidify the cream cheese and thereby obtain a cream cheese pretzel. The cream cheese has concave opposite ends. The pretzel provides a double taste of the pretzel material and the cream cheese.

EXAMPLE 5

80 parts by weight of strong wheat flour, 10 parts by weight of weak wheat flour, 10 parts by weight of corn flour 6 parts by weight sugar, 8 parts by weight of butter, 2 parts by weight of shortening, 28 parts by weight of potato starch, 2 parts by weight of salt, 0.5 part by weight of sodium bicarbonate and 65 parts in weight of water were mixed with each other and stirred to prepare the material for the pretzel.

The material was extruded by an extruder provided with a ring nozzle having an outer diameter of 6 millimeters and an inner diameter of 4 millimeters to thereby form a cylindrically shaped extruded material with a hollow portion along the longitudinal direction. The extruded material was continuously immersed into a liquid containing 0.7% of sodium hydroxide at a temperature of 95° C. in an alkaline bath and thereafter baked by mesh oven to produce the baked pretzel material having an outer diameter of 5 millimeters and inner diameter of 2.5 millimeters.

The baked material was then cut to a length of 120 millimeters and positioned in a vertical direction so that, from an upper opening of the hollow portion of the baked material, melted chocolate was injected and subsequently cooled down to solidify the melted chocolate and thereby obtain a chocolate pretzel. The solid chocolate has concave opposite ends. The pretzel provides a double taste of the pretzel material and the chocolate.

EXAMPLE 6

40 parts by weight of strong wheat flour, 60 parts by weight of weak wheat flour, 18 parts by weight of starch syrup (25% of moisture), 15 parts by weight of sugar, 15 parts by weight of butter, 13 parts by weight of shortening, 48 parts by weight of wheat starch, 5 parts by weight of skim milk, 1.5 parts by weight of salt, 1 part by weight of sodium bicarbonate and 60 parts by weight of water were mixed with each other and stirred to prepare the material for the pretzel.

The material was extruded in an extruder provided with a ring nozzle having an outer diameter of 6 millimeters and an inner diameter of 4 millimeters to thereby form a cylindrically shaped extruded material with a hollow portion along the longitudinal direction. The extruded material was continuously immersed into a liquid containing 0.7% of sodium hydroxide at a temperature of 95° C. in an alkaline bath and thereafter baked in a mesh oven to produce the baked pretzel material having an outer diameter of 5 millimeters and inner diameter of 2.5 millimeters.

The baked material was then cut to a length of 120 millimeters and positioned in a vertical direction so that, from an upper opening of the hollow portion of the baked material, melted chocolate was injected and subsequently cooled down to solidify the melted chocolate and thereby obtain a chocolate pretzel. The solid chocolate has concave opposite ends. The pretzel provides a double taste of the pretzel material and the chocolate.

EXAMPLE 7

50 parts by weight of strong wheat flour, 50 parts by weight of weak wheat flour, 5 parts by weight of sugar, 8 parts by weight of shortening, 1 part by weight of salt and 55 parts by weight of water were mixed with each other and stirred to prepare the material for the pretzel.

The material was extruded in an extruder provided with a ring nozzle having an outer diameter of 12 millimeters and an inner diameter of 4 millimeters to thereby form a cylindrically shaped extruded material with a hollow portion along the longitudinal direction. The extruded material was continuously immersed into a liquid containing 0.7% of sodium hydroxide at a temperature of 95° C. in an alkaline bath and thereafter baked by mesh oven to produce the baked pretzel material having an outer diameter of 11 millimeters and inner diameter of 3 millimeters.

The baked material was then cut to a length of 120 millimeters and positioned in a vertical direction so that, from an upper opening of the hollow portion of the baked material, melted chocolate was injected and subsequently cooled down to solidify the melted chocolate and thereby obtain a chocolate pretzel. The solid chocolate has concave opposite ends. The pretzel provides a double taste of the pretzel material and the chocolate.

EXAMPLE 8

100 parts by weight of strong wheat flour, 50 parts by weight of sugar, 55 parts by weight of shortening, 50 parts by weight of wheat starch, 5 parts by weight of skim milk, 1.5 parts by weight of salt, 0.5 part by weight of sodium bicarbonate and 70 parts by weight of water were mixed with each other and stirred to prepare the material for the pretzel.

The material was extruded in an extruder provided with a ring nozzle having an outer diameter of 12 millimeters and an inner diameter of 4 millimeters to thereby form a cylindrically shaped extruded material with a hollow portion along the longitudinal direction. The extruded material was continuously immersed into a liquid containing 0.7% of sodium hydroxide at a temperature of 95° C. in an alkaline bath and thereafter baked by mesh oven to produce the baked pretzel material having an outer diameter of 11 millimeters and inner diameter of 3 millimeters.

The baked material was then cut at a length of 120 millimeters and positioned in a vertical direction so that, from an upper opening of the hollow portion of the baked material, melted chocolate was injected and subsequently cooled down to solidify the melted chocolate and thereby obtain a chocolate pretzel. The solid chocolate has concave opposite ends. The pretzel provides a double taste of the pretzel material and the chocolate.

COMPARATIVE EXAMPLE 100 parts by weight of weak wheat flour, 4 parts by weight of shortening, 1 part by weight of salt, 0.3 parts by weight of baking powder and 33 parts by weight of water were mixed with each other and stirred to prepare the material for the pretzel.

The material was extruded by in extruder provided with a ring nozzle having an outer diameter of 6 millimeters and an inner diameter of 4 millimeters, but resulted in a product with cracks. The extruded material with cracks was baked in a mesh oven and produced a baked material with splits. Injection of melted chocolate results in leakage of chocolate from the cracks or splits. The resultant pretzel was extremely crispy and did not taste good.

PANEL TEST

The novel pretzel of the Example 1 according to the present invention and the conventional one which was commercially available were subjected to panel testing tests by 121 panelists.

The results which follow demonstrate that the novel pretzel according to the present invention received evaluations of better taste than the conventional one, and proved to be suitable for eating due to freedom from any adhesion of chocolate to hands of the panelists.

As to the taste of the product, 65% of the panelists liked the novel pretzel prepared according to Example 1; 23.3% liked the prior art pretzel; and 11.7% liked neither.

As to the taste of material, 66.7% of the panelists liked the novel pretzel prepared according to Example 1; 25% liked the prior art pretzel; and 8.3% liked neither.

As to balance, 67.7% of the panelists liked the novel pretzel prepared according to Example 1; 19.2% liked the prior art pretzel; and 13.1% liked neither.

As to sweetness, 62.5% of the panelists liked the novel pretzel prepared according to Example 1; 20.8% liked the prior art pretzel; and 16.7% liked neither.

As to feeling, 68.4% of the panelists liked the novel pretzel prepared according to Example 1; 15.8% liked the prior art pretzel; and 15.8% liked neither.

As to lightness, 68.1% of the panelists liked the novel pretzel prepared according to Example 1; 10.9% liked the prior art pretzel; and 21% liked neither.

As to aftertaste, 67.2% of the panelists liked the novel pretzel prepared according to Example 1; 16.8% liked the prior art pretzel; and 16% liked neither.

What is claimed is:

1. A pretzel having a cylindrical shape defining a hollow portion along a longitudinal center of said pretzel, said cylindrical shape having an outer diameter of 15 millimeters or less and an inner diameter of 40% or more of the outer diameter, wherein said pretzel is prepared by baking a material which consists essentially of 100 parts by weight of grain flour, 5–30 parts by weight of saccharides, 10–30 parts by weight of oils and fats, and 20–50 parts by weight of starch.

2. The pretzel as claimed in claim 1, wherein said saccharides are in the range of from 10 to 20 parts by weight, said oils and fats are in the range of from 15 to 25 parts by weight and said starch is in the range of from 30 to 45 parts by weight.

3. The pretzel as claimed in claim 1, wherein the cylindrical shape has an outer diameter of 10 millimeters or less.

4. The pretzel as claimed in claim 1, wherein said hollow portion of said pretzel is filled with a tasting material for providing a predetermined taste to said pretzel.

5. The pretzel as claimed in claim 4, wherein said tasting material is confined within opposite opening portions of said hollow portion of said baked material, and opposite ends of said tasting material within said hollow portion of said pretzel have a concave shape.

6. A process for preparation of a pretzel comprising the steps of:

preparing a material which consists essentially of 100 parts by weight of grain flour, 5–30 parts by weight of saccharides, 10–30 parts by weight of oils and fats and 20–50 parts by weight of starch, extruding said material through a ring nozzle having an outer diameter of 18 millimeters or less and an inner diameter of 50% or more of said outer diameter so that said extruded material has a cylindrical shape with a hollow portion along a longitudinal center of said pretzel, baking said extruded material, cutting said baked material, and injecting a tasting material having an adjusted viscosity into said hollow portion.

7. The process as claimed in claim 6, wherein said saccharides are in the range from 10 to 20 parts by weight, said oils and fats are in the range from 15 to 25 parts by weight and said starch is in the range from 30 to 45 parts by weight.

8. The process as claimed in claim 6, wherein said ring nozzle has an outer diameter within 11 millimeters.

9. The process as claimed in claim 6, further comprising the step of subjecting said extruded material to an alkaline liquid treatment prior to said baking step.

* * * * *